(12) United States Patent
Yen

(10) Patent No.: US 6,711,023 B2
(45) Date of Patent: Mar. 23, 2004

(54) EXPANDING CARD FIXING STRUCTURE

(75) Inventor: Heng-Chih Yen, Shindian (TW)

(73) Assignee: Arima Computer Corp., Taipei (TW)

( * ) Notice: Subject to any disclaimer, the term of this patent is extended or adjusted under 35 U.S.C. 154(b) by 13 days.

(21) Appl. No.: 10/216,504

(22) Filed: Aug. 8, 2002

(65) Prior Publication Data

US 2004/0027797 A1 Feb. 12, 2004

(51) Int. Cl.$^7$ ................................................ G06F 1/16
(52) U.S. Cl. ...................... 361/740; 361/747; 361/801
(58) Field of Search .............................. 361/610, 683, 361/686, 724–727, 740–829

(56) References Cited

U.S. PATENT DOCUMENTS

| | | | | |
|---|---|---|---|---|
| 5,544,006 A | * | 8/1996 | Radloff et al. ............... | 361/683 |
| 5,673,182 A | * | 9/1997 | Garner ........................ | 361/829 |
| 6,017,004 A | * | 1/2000 | Grantham .................... | 248/27.3 |
| 6,046,912 A | * | 4/2000 | Leman ........................ | 361/784 |
| 6,118,668 A | * | 9/2000 | Scholder et al. ............ | 361/753 |

* cited by examiner

*Primary Examiner*—Darren Schuberg
*Assistant Examiner*—Anthony Q. Edwards
(74) *Attorney, Agent, or Firm*—Pro-Techtor International Services

(57) ABSTRACT

This invention discloses an expanding card fixing structure that applies to fixing an expanding card in a computer. Such structure comprises an expanding slot, a conversion apparatus, a base, a ⊓-type or L-type batten and an upper cover. After inserting the expanding card into the slot side of the conversion apparatus and inserting the card side of the conversion apparatus into a expanding slot in the motherboard of the computer, the front end of the expanding card is pressed down through rotating the arms of the batten which is pivoted on the base, and then the batten continuously is pressed down by the upper cover.

15 Claims, 9 Drawing Sheets

EXPANDING CARD FIXING STRUCTURE

BACKGROUND OF THE INVENTION

1. Field of the Invention

This invention discloses an expanding card fixing structure, especially using a ⊓-type or L-type batten and an upper cover, which applies to fixing the expanding card in the expanding slot much firmly through being pressing down the front end of the expanding card by the batten and the upper cover.

2. Description of the Related Art

Referring to FIG. 1, it illustrates a three-dimensional dissolution drawing of the expanding card fixing structure 100 in the prior art. There is an expanding card 101 and an expanding slot 102 in this figure. The back end of the expanding card 101 connects a fixing structure 103 with a shape of reverse L to directly lock in the computer apparatus 105 through screw 104. The expanding slot 102 is in the motherboard 201 of the computer apparatus 105 to install the expanding card 101 and expand the function of the computer apparatus 105.

Next, referring to FIG. 2, it illustrates that the expanding card 101 is directly inserted into the expanding slot 102 and locking the fixing structure 103 with a shape of reverse L in the back end of the expanding card 101 in the case 106 of the computer apparatus 105 through a screw 104.

In the foregoing expanding card fixing structure 100, the length of the expanding card 101 is usually longer than the length of the expanding slot 102; and it will lead to signal transmission error because of the gravity drooping the front end of the expanding card 101 and the expanding card 101 being unable to tightly connecting the computer apparatus 105 through the expanding slot 102.

In order to lock the expanding card 101 in the expanding slot 102 much firmly, referring to FIG. 3, in the advance prior art, the function is still reserved that locking the back end of the expanding card 101 through the screw 104. Besides, this prior art further sets a slot 200 in the front of the expanding card 101 in order to make the front of the expanding card 101 sliding into the slot 200. It can strengthen the connection between the expanding card 101 and the expanding slot 102 through simultaneously fixing the front end and the back end of the expanding card 101

However, by the appearance of the computer apparatus 105 being getting mini, the expanding card 101 is not only direct inserting into the expanding slot 102 upright but also through a conversion interface 301 as shown in FIG. 4.

FIG. 4-1 is enlargement drawing of the conversion interface 301 in FIG. 4, there are two connecting faces 504 and 505 in the conversion apparatus and they can bend to the vertical shape through a connecting cable 510 that connects between the two connecting faces 504 and 505.

There is a card side 506 and a slot side 507 in each of both connecting faces 504 and 505. By this, the expanding card 101 can be inserted into the slot side 507 of the conversion apparatus 301 and the card side 506 of the conversion apparatus 301 is either inserted into the expanding slot 102 to lay the expanding card 101 horizontally in the motherboard 201 of the computer apparatus 105 for avoiding the occupied much space that the expanding card 101 sets upright in the motherboard 201 of the computer apparatus 105.

Referring to FIG. 4, the front and back end of the expanding card 101 are fixed separately through the slot 200 and the screw 104, and the expanding card 101 lays horizontally in the motherboard 201 of the computer apparatus 105. It seems that the defects of locking the expanding card 101 only through screw 104 and occupied space that the expanding card 101 sets upright in the motherboard 201 of the computer apparatus 105 is solved. But in practically plug and pull the expanding card 101, such design of the slot 200 is still inconvenient In the FIG. 4, It's obvious to see that the case 106 of the computer apparatus 105 being unable to avoid separating the passage that the expanding card 101 slides into the expanding slot 102. The better way is to remove a side 401 of the case 106 corresponding to the expanding card 101 sliding to the slot 200, as shown in FIG. 5. But the process seems complicate with simply plugging and pulling the expanding card 101.

According to the foregoing defects, the invention discloses an expanding card fixing structure for easy plugging and pulling the expanding card at the expanding slot.

SUMMARY OF THE INVENTION

The first objective of the invention discloses an expanding card fixing structure for easy plugging and pulling the expanding card at the expanding slot.

The second objective of the invention discloses an expanding card fixing structure for the expanding card laying horizontally in the motherboard of the computer apparatus to solve the defects of unnecessary case space that the expanding card sets upright at the expanding slot in the foregoing art.

For the foregoing objective, this invention disposes an expanding card fixing structure that applies to fixing an expanding card in a computer. Such fixing structure comprises an expanding slot, a conversion apparatus, a base, a batten and an upper cover. The expanding slot vertically sets in a motherboard of the computer apparatus. The conversion apparatus has two connecting faces, and there is a card side and a slot side on each connecting face. The base that can be set computer component like hard disk, CD-ROM and floppy disk storage apparatus is in the computer apparatus and in the front of the expanding slot. The batten can be a shape of ⊓-type or L-type. The both arms of the ⊓-type batten are respectively pivoted on both sides of the base and one arm of the L-type batten connects any side of the base after inserting the expanding card into the slot side of the conversion apparatus and inserting the card side of the conversion apparatus into the expanding slot, we can press down the front end of the expanding card through rotating the arms of ⊓-type or of L-type batten. Then we can fix the expanding card in the expanding slot much firmly through the upper cover to continuously press down the ⊓-type or L-type batten.

BRIEF DESCRIPTION OF DRAWINGS

The following detailed description, given by way of examples and not intended to limit the invention to the embodiment described herein, will best be understood in conjunction with the accompanying drawings, in which:

FIG. 4-1 is enlargement drawing of the conversion interface in FIG. 4;

DETAILED DESCRIPTION OF THE INVENTION

The following detailed description about the expanding card fixing structure of the invention is given by the first and second embodiments.

The First Embodiment

Figure 1:
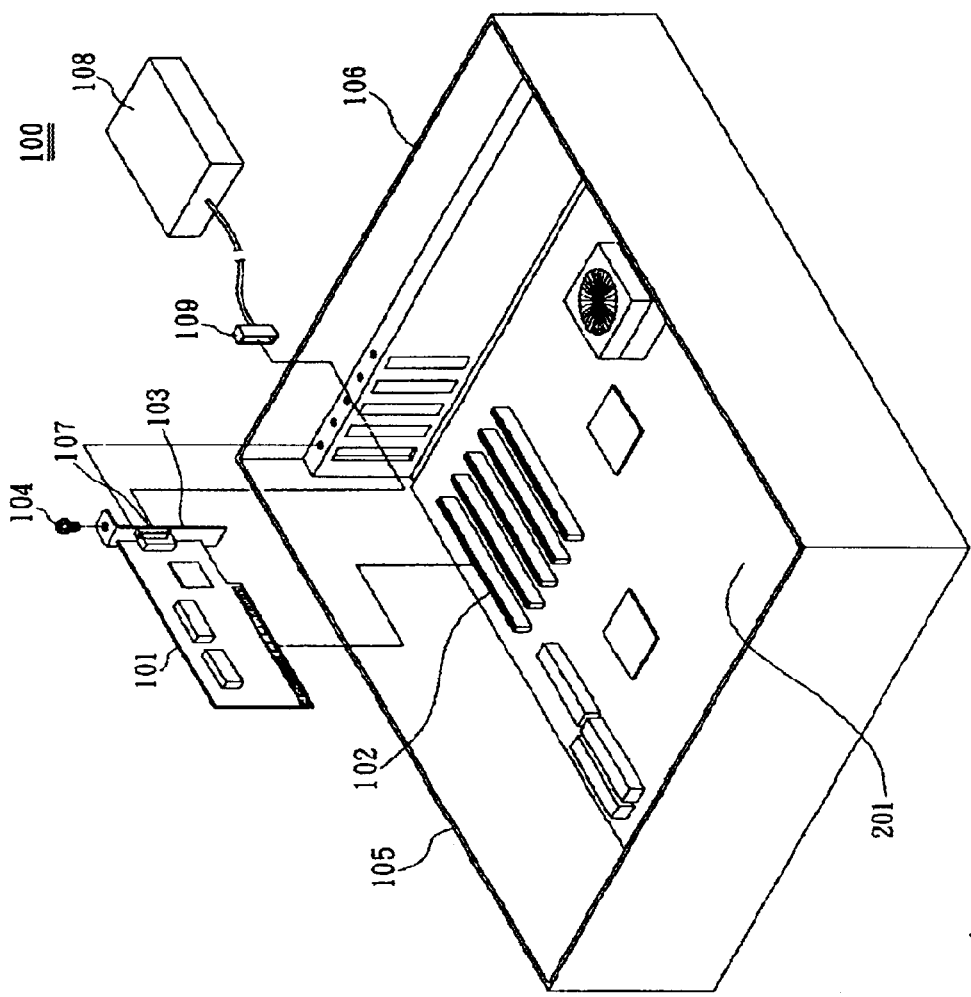
FIG. 1 illustrates a three-dimensional dissolution drawing of the expanding card fixing structure in a first prior art.
Figure 2:
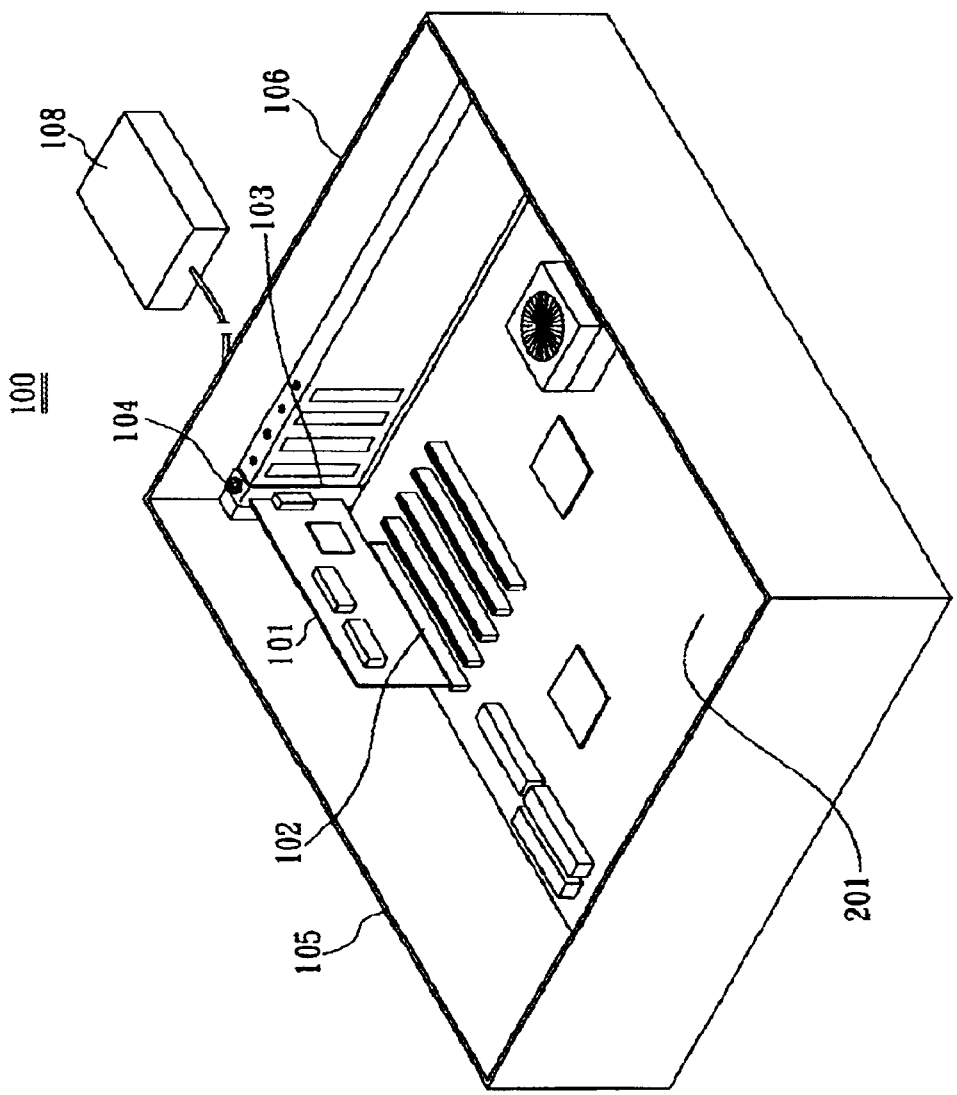
FIG. 2 illustrates a three-dimensional combination drawing of the expanding card fixing structure in the first prior art.
Figure 3:
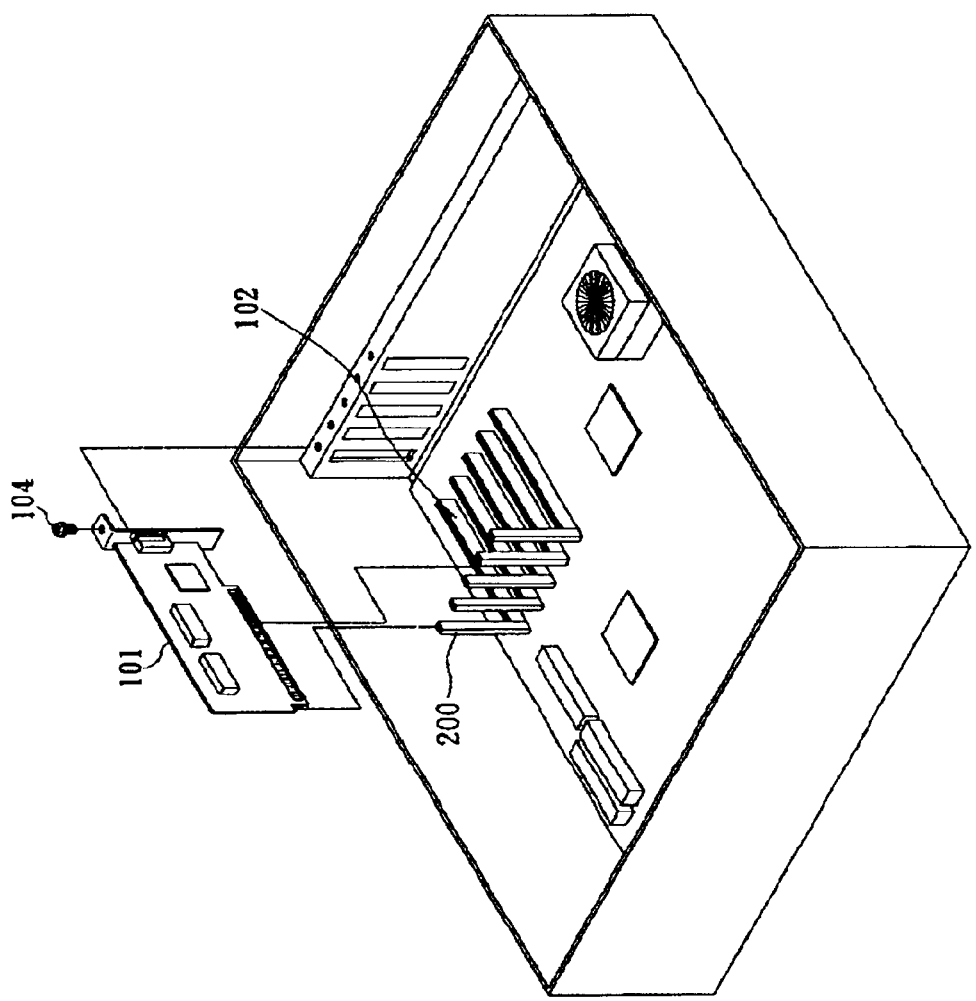
FIG. 3 illustrates a three-dimensional dissolution drawing of the expanding card fixing structure in a second prior art.
Figures 1, 4:
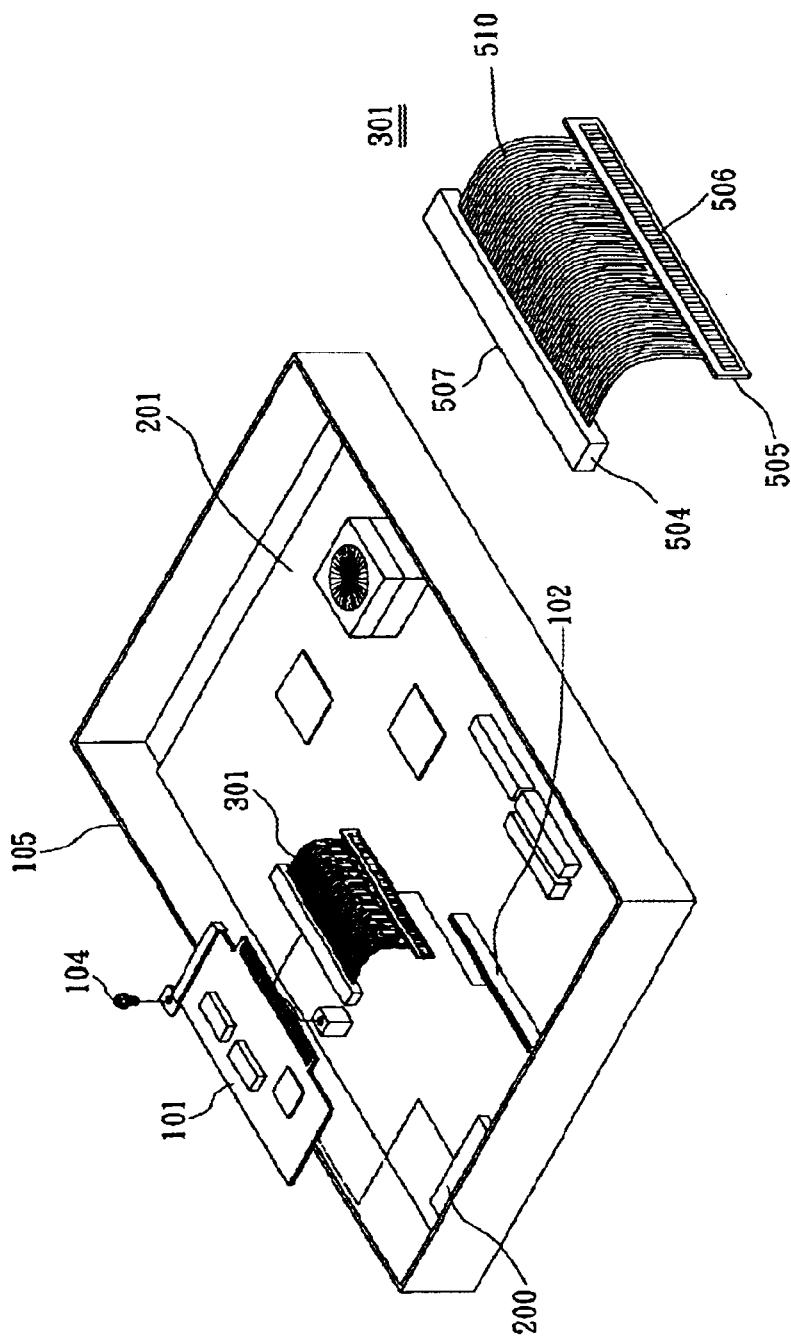
FIG. 4 illustrates a three-dimensional dissolution drawing of the expanding card fixing structure in a third prior art.
Figure 5:
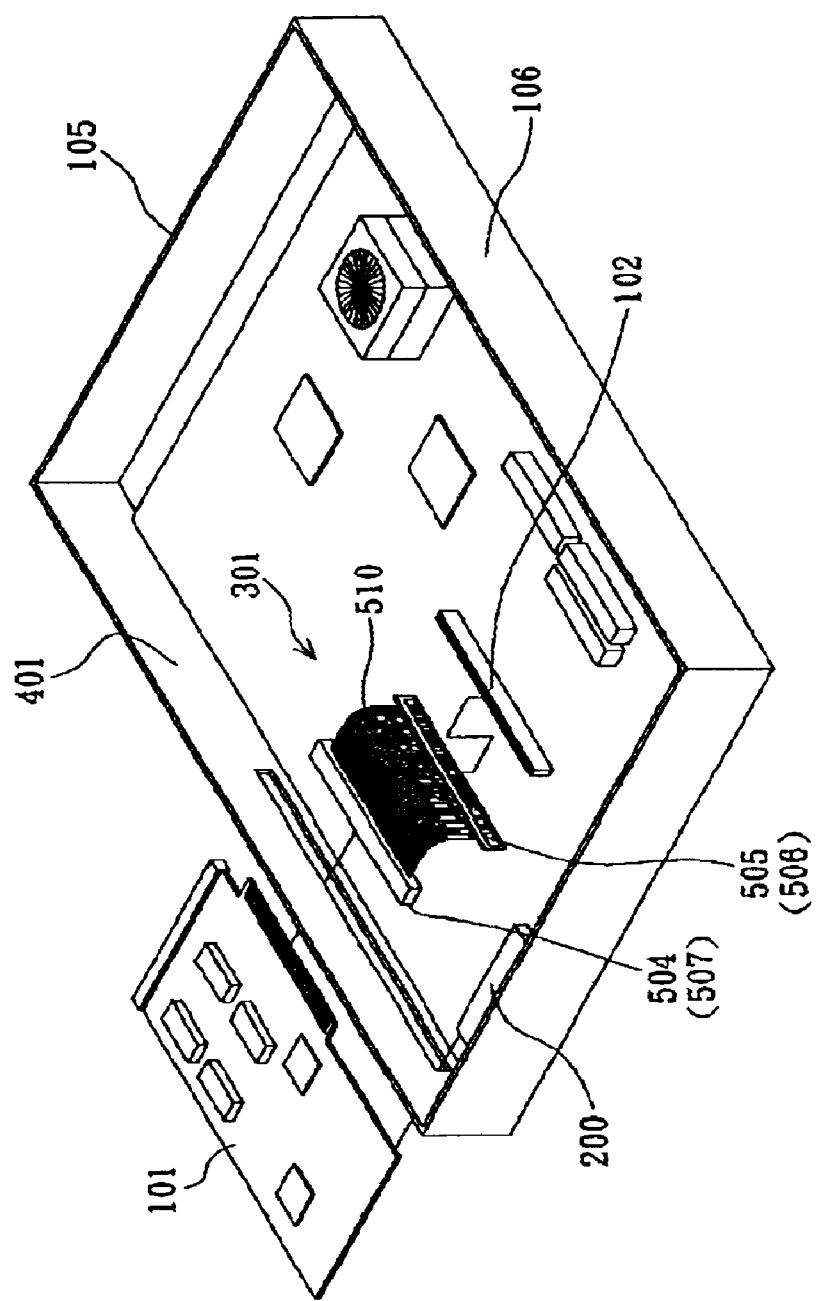
FIG. 5 illustrates a three-dimensional dissolution drawing of the expanding card fixing structure in a fourth prior art.
Figure 6:
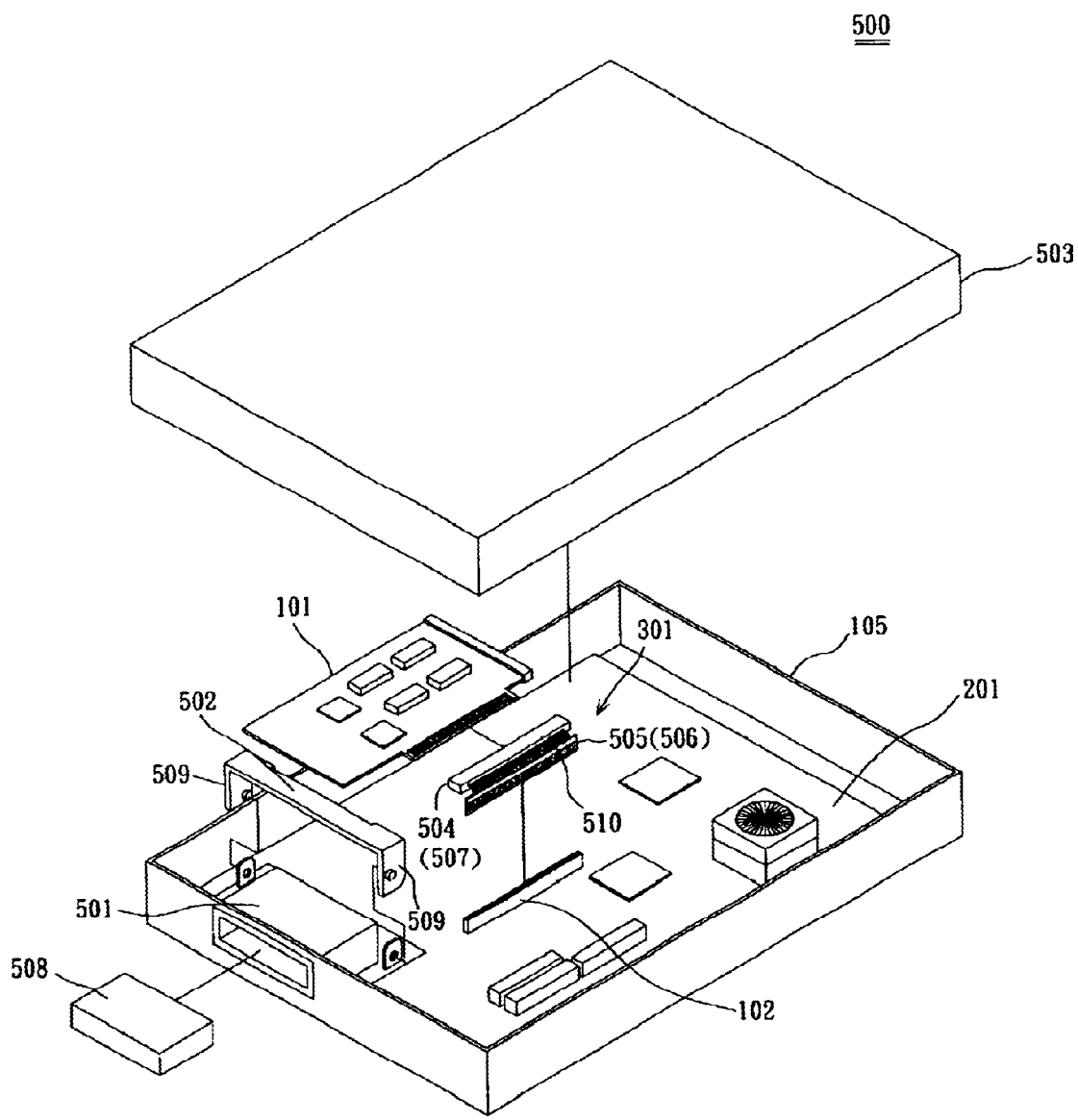
FIG. 6 illustrates a three-dimensional dissolution drawing of the expanding card fixing structure in a first embodiment of the invention.

FIG. 6 illustrates an expanding card fixing structure 500 in the first embodiment of the invention that applies to fixing an expanding card 101 in a computer apparatus 105. The fixing structure 500 comprises an expanding slot 102, a conversion apparatus 301, a basic structure 501, a ⊓-type batten 502 and an upper cover 503. The expanding slot 102 vertically sets in a motherboard 201 of the computer apparatus 105. The conversion apparatus 301 has two connecting faces 504 and 505, and there is a card side 506 and a slot side 507 on each connecting face 504 or 505. The basic structure 501 that can be set a computer component 508,such as a hard disk, a CD-ROM or a floppy disk storage apparatus, is in the computer apparatus 105 and in the front of the expanding slot 102. The both arms 509 of the ⊓-type batten 502 are pivoted on both sides of the base 501.

Figure 7:
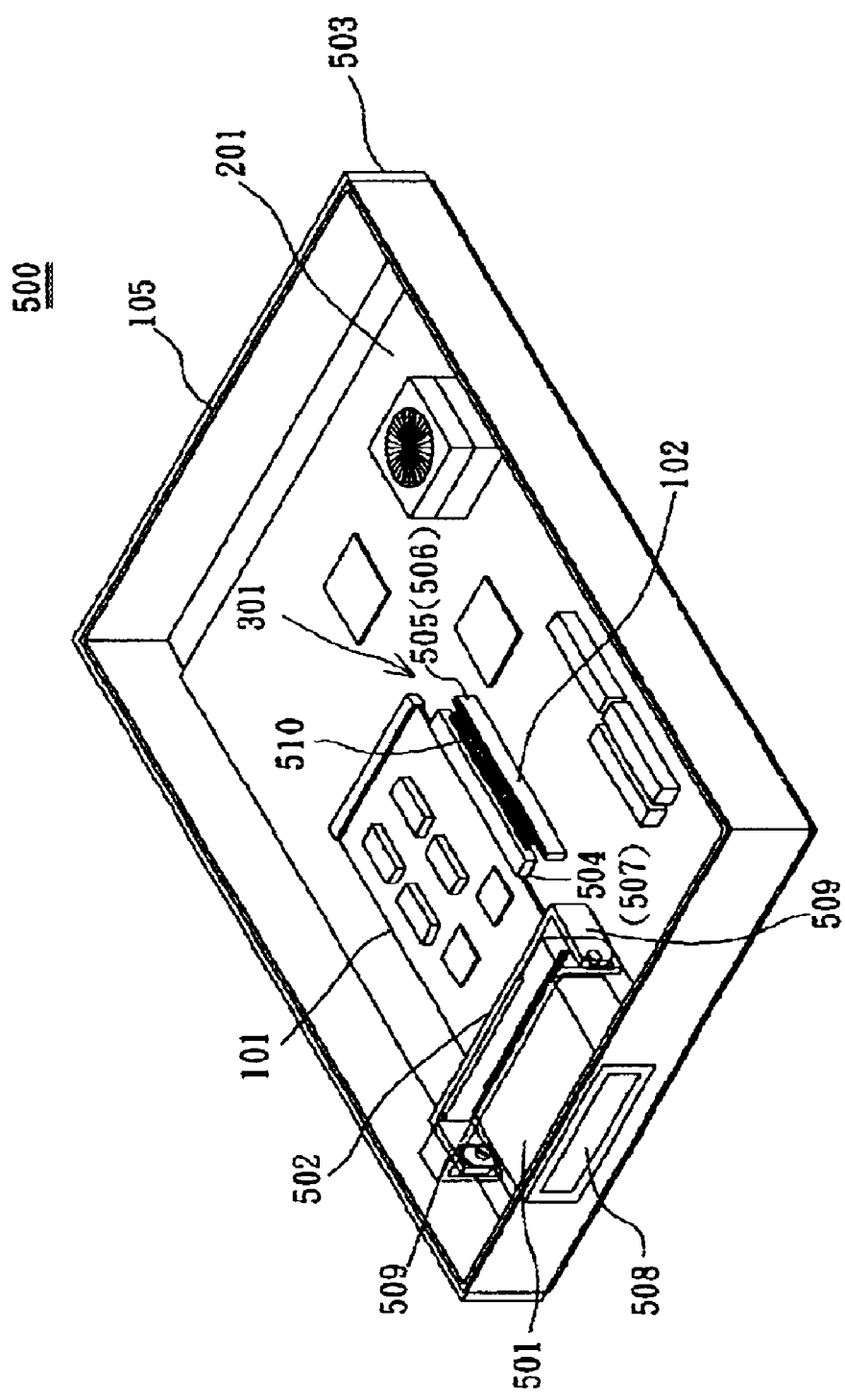
FIG. 7 illustrates a three-dimensional combination drawing of the expanding card fixing structure in the first embodiment of the invention.

As shown in FIG. 7, after inserting the expanding card 101 into the slot side 507 of the conversion apparatus 301 and inserting the card side 506 of the conversion apparatus 301 into the expanding slot 102, we can press down the front end 510 of the expanding card 101 through rotating the arms 509 of the ⊓-type batten 502. Then we can fix the expanding card 101 in the expanding slot 102 much firmly through the upper cover 503 to continuously press down the ⊓-type batten 502.

The Second Embodiment

Figure 8:
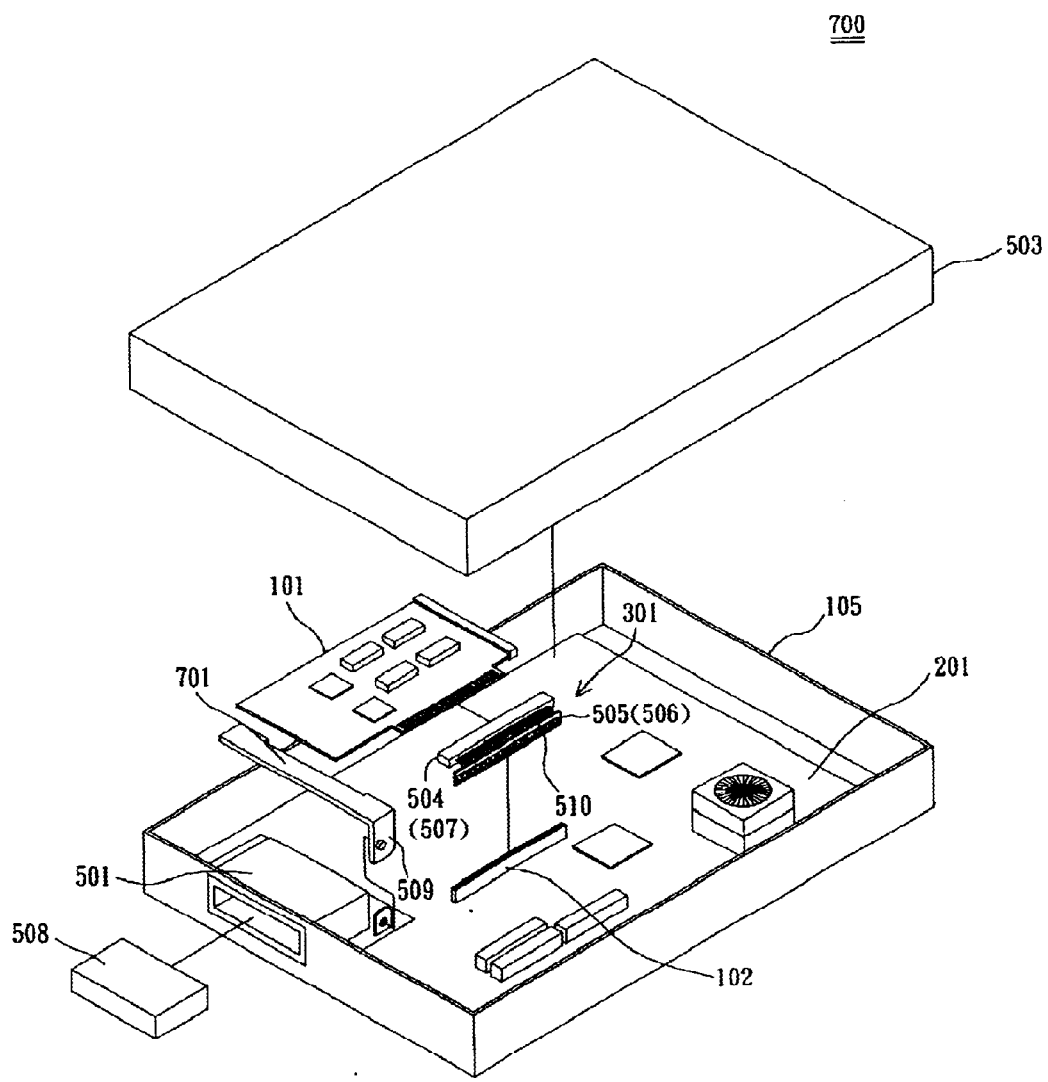
FIG. 8 illustrates a three-dimensional dissolution drawing of the expanding card fixing structure in a second embodiment of the invention.

FIG. 8 illustrates an expanding card fixing structure 700 in the second embodiment of the invention that applies to fixing an expanding card 101 in a computer apparatus 105. This fixing structure 700 is similar to that of the first embodiment, comprising an expanding slot 102, a conversion apparatus 301, a base 501, a batten 701 and an upper cover 503. However, such batten's shape is L-type in this embodiment, which is different from the first embodiment. The fix structure 700 comprises an expending slot 102, a conversation apparatus 301, a basic structure 501, a L-type batten 701 and an upper cover 503. The expanding slot 102 vertically sets in a motherboard 201 of the computer apparatus 105. The conversion apparatus 301 has two connecting faces 504 and 505, and there is a card side 506 and a slot side 507 on each connecting face 504 or 505. The basic structure 501 that can be set computer component 508 like hard disk, CD-ROM and floppy disk storage apparatus is in the computer apparatus 105 and in the front of the expanding slot 102. One arm 509 of the L-type batten 701 is pivoted on one side of the base 501.

Figure 9:
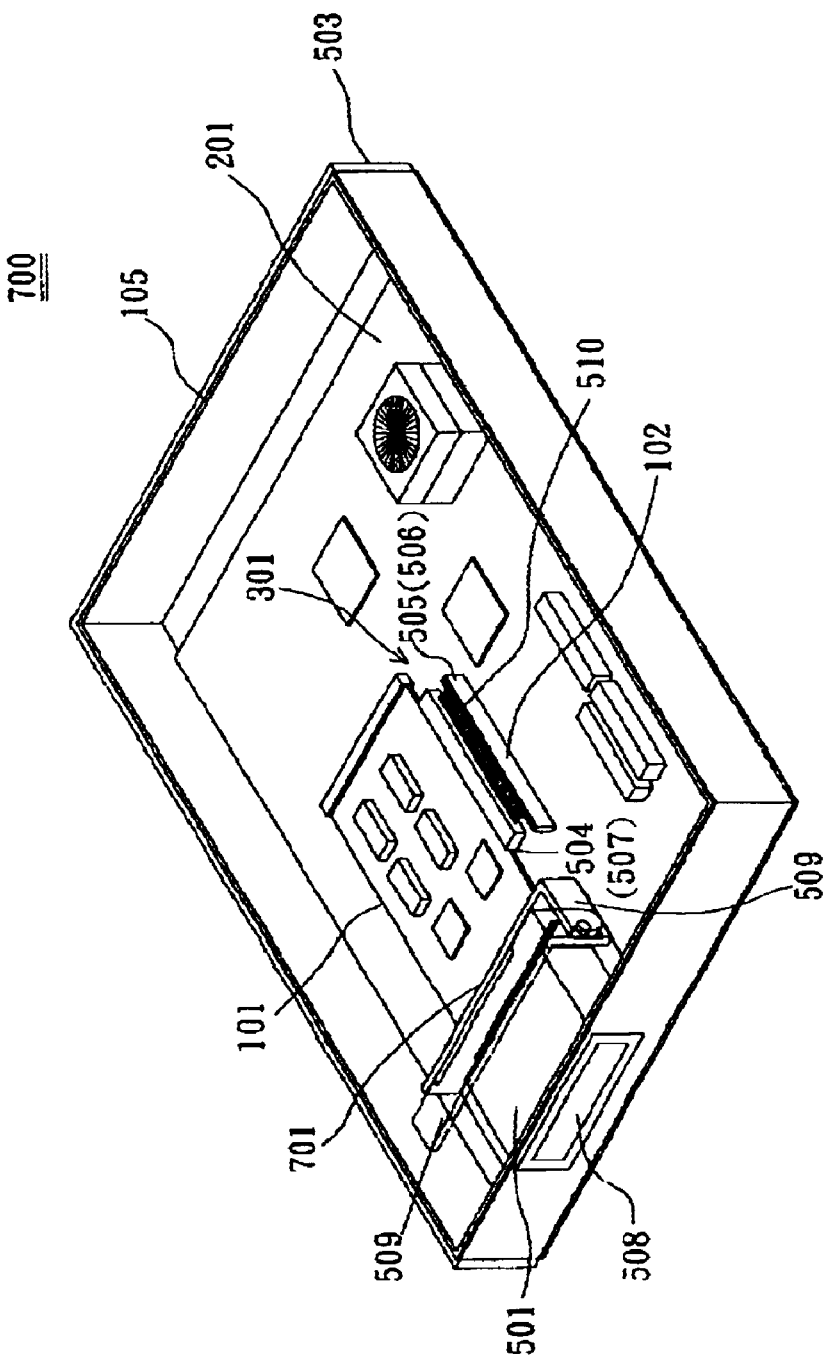
FIG. 9 illustrates a three-dimensional combination drawing of the expanding card fixing structure in the second embodiment of the invention.

As shown in FIG. 9, after inserting the expanding card 101 into the slot side 507 of the conversion apparatus 301 and inserting the card side 506 of the conversion apparatus 301 into the expanding slot 102, we can press down the front end 510 of the expanding card 101 through rotating the arm 509 of the L-type batten 701. Then we can fix the expanding card 101 in the expanding slot 102 much firmly through the upper cover 503 to continuously press down the L-type batten 701.

According the foregoing embodiments, the expanding card can easily plug and pull at the expanding slot and lay horizontally in the motherboard of the computer apparatus to solve the defects of unnecessary case space that the expanding card sets upright at the expanding slot in the foregoing art.

Although described above in connection with the preferred embodiments, one skilled in the art will appreciate that the present invention can be implemented in other embodiments while remaining within the scope of the present invention as defined in the appended claims as follows.

What is claimed is:

1. An expanding card fixing structure that applies to fixing an expanding card in a computer apparatus, said fixing structure comprising:

an upper cover;

an expanding slot vertically setting in a motherboard of said computer apparatus;

a conversion apparatus, having two connecting faces with a card side and a slot side, which are respectively installed on each said connecting face;

a base settling in said computer apparatus and before a front end of said expanding slot; and a ⊓-type batten, having both arms which are respectively pivoted on both sides of said base;

wherein, after inserting said expanding card into said slot side and inserting said card side into said expanding slot, a front end of said expanding card being pressed down by said ⊓-type batten through rotating the arms of said ⊓-type batten, and then said batten continuously being pressed down by said upper cover.

2. The expanding card fixing structure of claim 1, wherein a back end of said expanding card is locked in said computer apparatus through a locking apparatus.

3. The expanding card fixing structure of claim 2, wherein said locking apparatus is a screw.

4. The expanding card fixing structure of claim 1, wherein said upper cover firmly locks in said computer apparatus.

5. The expanding card fixing structure of claim 1, wherein said connecting faces can be bended to a vertical shape through a connecting cable that connects between said two connecting faces.

6. The expanding card fixing structure of claim. 1, wherein said base can be set in a computer component.

7. The expanding card fixing structure of claim 6, wherein said computer component is a storage apparatus.

8. An expanding card fixing structure that applies to fixing an expanding card in a computer apparatus, said fixing structure comprising:

an upper cover;

an expanding slot vertically setting in a motherboard of said computer apparatus;

a conversion apparatus, having two connecting faces with a card side and a slot side, which are respectively installed on each said connecting face;

a base settling in said computer apparatus and before a front end of said expanding slot; and a batten, having at least one arm, which is pivoted on one side of said base;

Wherein, after inserting said expanding card into said slot side and inserting said card side into said expanding slot, a front end of said expending card being pressed down by said batten through rotating said arm, and then said batten continuously being pressed down by said upper cover.

9. The expanding card fixing structure of claim 8, wherein a back end of said expanding card is locked in said computer apparatus through a locking apparatus.

10. The expanding card fixing structure of claim 9, wherein said locking apparatus is a screw.

11. The expanding card fixing structure of claim 8, wherein said upper cover firmly locks in said computer apparatus.

12. The expanding card fixing structure of claim 8, wherein said connecting faces can be bended to a vertical shape through a connecting cable that connects between said two connecting faces.

13. The expanding card fixing structure of claim 8, wherein said base can be set a computer component.

14. The expanding card fixing structure of claim 13, wherein said computer component is a storage apparatus.

15. The expanding card fixing structure of claim 8, wherein said batten can be a shape of ⊓-type or L-type.

* * * * *